(12) United States Patent
Song et al.

(10) Patent No.: US 12,429,165 B2
(45) Date of Patent: Sep. 30, 2025

(54) HIGH-PRESSURE TANK HAVING SEALING BOSS AND MANUFACTURING METHOD THEREOF

(71) Applicant: HANWHA SOLUTIONS CORPORATION, Seoul (KR)

(72) Inventors: Kun Ha Song, Sejong-si (KR); Jong Min Lee, Sejong-si (KR); Jae Hyung Nam, Sejong-si (KR); Dong Hun Yang, Sejong-si (KR); Sung Chul Kim, Sejong-si (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 0 days.

(21) Appl. No.: 17/466,574

(22) Filed: Sep. 3, 2021

(65) Prior Publication Data

US 2022/0099250 A1 Mar. 31, 2022

(30) Foreign Application Priority Data

Sep. 28, 2020 (KR) ........................ 10-2020-0125986

(51) Int. Cl.
*F17C 1/00* (2006.01)
*B29C 45/00* (2006.01)
(Continued)

(52) U.S. Cl.
CPC ............ *F17C 1/00* (2013.01); *B29C 45/0053* (2013.01); *B29C 45/1418* (2013.01);
(Continued)

(58) Field of Classification Search
CPC ................ F17C 1/00; F17C 2201/0109; F17C 2203/0604; F17C 2203/0643; F17C 2203/0646; F17C 2203/066; F17C 2205/0305; F17C 2209/2118; F17C 2209/227; F17C 2221/012;
(Continued)

(56) References Cited

U.S. PATENT DOCUMENTS 5,538,680 A * 7/1996 Enders .................. B29C 66/131
264/516
2002/0064599 A1 5/2002 McAndrew
(Continued)

FOREIGN PATENT DOCUMENTS

DE 112017003239 T5 3/2019
EP 0300931 B1 * 9/1991
(Continued)

OTHER PUBLICATIONS

English Machine Translation of KR2020200001108 (Year: 2020).*
(Continued)

*Primary Examiner* — Don M Anderson
*Assistant Examiner* — Laura E. Parker
(74) *Attorney, Agent, or Firm* — Sughrue Mion, PLLC

(57) ABSTRACT

A high-pressure tank includes: a boss portion formed at one end thereof with a skirt extending radially outward, the skirt having multiple connection holes formed along an outer periphery thereof; a sealing portion formed on an outer surface of the skirt; a dome portion coupled with the sealing portion; and a liner portion coupled with the dome portion.

19 Claims, 7 Drawing Sheets

(51) Int. Cl.
*B29C 45/14* (2006.01)
*B29K 77/00* (2006.01)
*B29L 31/00* (2006.01)

(52) U.S. Cl.
CPC .. *B29C 2045/0079* (2013.01); *B29K 2077/00* (2013.01); *B29L 2031/7156* (2013.01); *F17C 2201/0109* (2013.01); *F17C 2203/0604* (2013.01); *F17C 2203/0643* (2013.01); *F17C 2203/0646* (2013.01); *F17C 2203/066* (2013.01); *F17C 2205/0305* (2013.01); *F17C 2209/2118* (2013.01); *F17C 2209/227* (2013.01); *F17C 2221/012* (2013.01); *F17C 2221/033* (2013.01); *F17C 2223/036* (2013.01)

(58) Field of Classification Search
CPC .............. F17C 2221/033; F17C 2223/036; F17C 1/16; F17C 13/06; F17C 2209/234
USPC .......................................................... 220/581
See application file for complete search history.

(56) References Cited

U.S. PATENT DOCUMENTS

| | | | | |
|---|---|---|---|---|
| 2004/0173618 | A1* | 9/2004 | Suzuki | F17C 1/16 220/581 |
| 2011/0220659 | A1 | 9/2011 | Strack | |
| 2011/0303681 | A1* | 12/2011 | Newhouse | F17C 1/06 220/601 |
| 2014/0144866 | A1* | 5/2014 | Heo | F17C 1/06 215/45 |
| 2016/0114521 | A1* | 4/2016 | Palvoelgyi | B29C 49/20 264/523 |
| 2017/0175951 | A1* | 6/2017 | Morgan | F17C 1/06 |
| 2018/0172208 | A1* | 6/2018 | Lee | F17C 13/00 |
| 2020/0363012 | A1* | 11/2020 | Watanabe | B32B 37/02 |
| 2022/0397237 | A1* | 12/2022 | Dufaure | F17C 1/005 |

FOREIGN PATENT DOCUMENTS

| | | | | |
|---|---|---|---|---|
| EP | 2778499 A1 | * | 9/2014 | ............ F17C 13/06 |
| JP | 4602399 B2 | | 12/2010 | |
| JP | 2013-520622 A | | 6/2013 | |
| KR | 10-2003-0041002 A | | 5/2003 | |
| KR | 20030041002 A | * | 5/2003 | |
| KR | 10-2009-0121761 A | | 11/2009 | |
| KR | 20200001108 U | * | 5/2020 | |
| KR | 2020200001108 | * | 5/2020 | |
| KR | 10-2020-0065334 A | | 6/2020 | |
| KR | 10-2020-0065656 A | | 6/2020 | |
| KR | 20200065334 A | * | 6/2020 | |
| KR | 10-2020-0090455 A | | 7/2020 | |
| WO | WO-9600142 A1 | * | 1/1996 | ........... B29C 65/606 |

OTHER PUBLICATIONS

English Machine Translation of EP-0300931-B1 (Year: 1991).*
Office Action issued Jan. 3, 2022 in Korean Application No. 10-2020-0125986.
Office Action issued May 26, 2022 in Korean Application No. 10-2020-0125986.
Communication issued May 19, 2025 in German Application No. 102021124945.7.

* cited by examiner

HIGH-PRESSURE TANK HAVING SEALING BOSS AND MANUFACTURING METHOD THEREOF

CROSS-REFERENCE TO RELATED APPLICATION

This application claims is based on and claims priority from Korean Patent Application No. 10-2020-0125986 filed on Sep. 28, 2020 in the Korean Intellectual Property Office, the disclosure of which is incorporated herein in its entirety by reference.

BACKGROUND

1. Field

The embodiments of the inventive concept relate to a high-pressure tank having a sealing boss, and more particularly, to a high-pressure tank having a sealing boss, which maintain coupling between a metal boss and a dome portion of a plastic liner through formation of a sealing structure on the boss, and a method of manufacturing the same.

2. Description of the Related Art

A high-pressure tank stores a fluid such as oxygen, natural gas, and hydrogen compressed therein, and requires a sealing structure to prevent leakage of the fluid during storage and transportation.

High-pressure tanks are largely classified into a type I high-pressure tank which is formed of a metal, a type II high-pressure tank which includes a metal liner with a composite added thereto and is lightweight, and a type III high-pressure tank which includes a metal liner reinforced with a composite full wrap. Recently, a type IV high-pressure tank, which includes a plastic liner reinforced with a composite instead of a metal liner to provide light weight, is being developed.

Since the type IV high-pressure tank is very lightweight due to use of a plastic liner and can effectively prevent leakage of a fluid, the type IV high-pressure tank has recently been spotlighted as a hydrogen storage tank for fuel cell vehicles.

For the type IV high-pressure tank, a metal boss is coupled to a plastic liner to form an injection port. Thus, the type IV high-pressure tank may suffer from fluid leakage or damage because of difficulty in maintaining coupling between different types of materials, that is, plastic and metal.

A related-art type IV high-pressure tank is manufactured by molding a plastic liner, machining a thread on an end of the liner to form a fastening structure, and attaching an adapter and a sealing ring to the liner. However, the related-art type IV high-pressure tank has problems of increase in manufacturing costs due to the need for a separate component to form an injection port, difficulty in completely eliminating the possibility of fluid leakage, and difficulty in quality control.

Therefore, there is demand for a high-pressure tank having a different boss structure, which can improve a manufacturing efficiency through effective coupling between a boss and a liner, and ensure gas-tightness to prevent leakage of a fluid.

Korean Patent Laid-open Publication No. 10-2009-0121761 relates to a composite high-pressure tank having a nozzle boss. This patent publication discloses a sealing structure between a liner and a boss. However, this sealing structure has a drawback of increase in manufacturing complexity because a separate thread is required to be formed on inner and outer portions of the liner for coupling between the liner and the boss.

SUMMARY

The embodiments of the inventive concept provides a high-pressure tank having a sealing boss, which has improved gas-tightness by enhancing coupling between different types of materials, that is, a polyamide resin forming a dome portion and a metal forming the boss, through establishment of physical coupling and chemical bonding using the sealing boss.

The embodiments also provide a high-pressure tank which has an improved structure by allowing a sealing structure formed at one end of a boss to replace additional components such as an adapter, an O-ring, and a backup ring.

The embodiment further provide a method of manufacturing a high-pressure tank having a sealing boss, wherein the method includes preforming the sealing boss, integrally coupling a dome portion to the sealing boss by metal insert injection molding, and joining a liner portion to the dome portion, and thus can ensure simplification of a boss fastening process and improved process efficiency.

According to an embodiment, there is provided a high-pressure tank which may include: a boss portion formed at one end thereof with a skirt extending radially outward, the skirt having multiple connection holes formed along an outer periphery thereof; a sealing portion formed on an outer surface of the skirt; a dome portion coupled with the sealing portion; and a liner portion coupled with the dome portion.

The boss portion may have at least one locking groove formed at a circumferential surface of an outer periphery of a body thereof and may be formed at the other end thereof with a flange.

The flange may have a polygonal outer periphery.

The boss portion may be formed of aluminum or stainless steel and may support a pressure of 700 bar to 900 bar.

The skirt may be anodized.

The skirt may have a fastening groove formed at one side thereof and coupled with a key the dome portion.

The skirt may extend radially outward from a center of the boss portion such that the skirt occupies an area of 20% to 40% of a total radial area formed by the skirt and the dome portion.

The skirt may have a stepped portion formed at one side of both outer and inner peripheral surfaces thereof, the stepped portion receiving one end of the dome portion and being coupled therewith.

The sealing portion may be formed by coating a material selected from polyphthalamide (PPA), polyamide 6 (PA6), polyamide 11 (PA11), polyamide 12 (PA12), and polyarylamide (PARA) onto an outer surface of the skirt to a thickness of 150 μm to 350 μm.

The dome portion may be formed of a polyamide resin.

The sealing portion and one end of the dome portion may be integrally formed with each other and chemically bonded to each other by insert injection molding.

According to an embodiment, there is provided a method of manufacturing a high-pressure tank having a sealing boss. The method may include: (a) preforming a boss portion formed at one end thereof with a skirt extending radially outward, the skirt having multiple connection holes formed along an outer periphery thereof; (b) forming a sealing portion by coating a thermoplastic resin onto an outer surface of the skirt; (c) forming a dome portion coupled with the sealing portion by insert injection molding in which the boss portion with the sealing portion formed thereon is loaded into a mold and a thermoplastic resin is injected into the mold; and (d) coupling a liner portion with the dome portion.

The sealing portion may be formed by coating a material selected from among polyphthalamide (PPA), polyamide 6 (PA6), polyamide 11 (PA11), polyamide 12 (PA12), and polyarylamide (PARA) onto the outer surface of the skirt to a thickness of 150 μm to 350 μm.

According to an embodiment, there is provided a method of manufacturing a high-pressure tank having a sealing boss. The method may include: (i) preforming a boss portion formed at one end thereof with a skirt extending radially outward, the skirt having multiple connection holes formed along an outer periphery thereof; (ii) forming a sealing portion by coating an outer surface of the skirt; and (iii) forming a dome portion and a liner portion at the same time by rotational liner molding in which the boss portion with the sealing portion formed thereon is loaded into a mold and a thermoplastic resin is injected into the mold.

A coating layer forming the sealing portion and the thermoplastic resin injected into the mold may be a polyamide resin.

The embodiments provide a high-pressure tank having an improved sealing boss, which can ensure effective reduction in use of adhesives and effective storage of a fluid at high pressure through prevention of separation of the boss from a dome portion due to the fluid by enhancing chemical bonding between different types of material, that is, a polyamide resin forming the dome portion and a metal forming the boss, through formation of a gas-tight interface therebetween and by establishing physical coupling between the boss and the dome portion through fastening of a key to a groove and insertion of a tab into a hole.

In addition, the high-pressure tank according to the embodiments can eliminate the need for a separate component for prevention of fluid leakage, such as an O-ring and a backup ring, through enhancement in coupling between the sealing boss and one end of the dome portion, and can eliminate the need for an additional adapter through improvement in the shape of the boss.

Further, according to the embodiments, since the sealing boss is integrally formed with the dome portion by metal insert injection molding, a boss coupling process can be simplified, and thus, efficiency and productivity of the high-pressure tank manufacturing process can be significantly improved.

DETAILED DESCRIPTION

Figure 1:
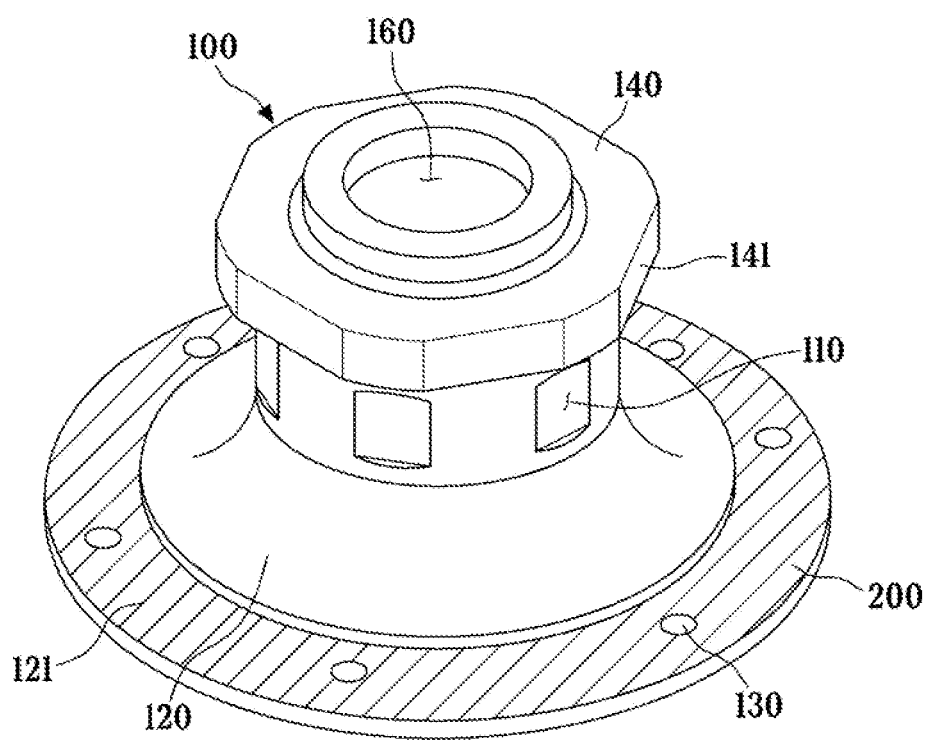
FIG. 1 is a top perspective view of a boss portion having a sealing structure of a high-pressure tank having a sealing boss, according to an embodiment.

Hereinafter, various embodiments of the inventive concept will be described in detail with reference to the accompanying drawings. The embodiments described herein are all example embodiments, and thus, the inventive concept is not limited thereto and may be realized in various other forms. It will be understood that the accompanying drawings are provided only to aid in understanding of the embodiments disclosed herein, and the technical spirit disclosed in the specification is not limited by the accompanying drawings. The shape, size, scale, angle, and number of each element illustrated in the drawings are examples, and thus, should not be construed as limiting the scope of the inventive concept.

It should be noted that like components will be denoted by like reference numerals throughout the specification and the accompanying drawings. In addition, description of known functions and constructions which may unnecessarily obscure the subject matter will be omitted.

As used herein, the terms "includes", "comprises", "including" and/or "comprising," specify the presence of stated features, steps, operations, elements, and/or components, but do not preclude the presence or addition of one or more other features, steps, operations, elements, components, and/or groups unless such terms are preceded by "only". As used herein, the singular forms "a", "an" and "the" are intended to include the plural forms as well, unless the context clearly indicates otherwise.

A numerical value related to a certain component is construed to include a tolerance range in interpretation of components, unless clearly stated otherwise.

It will be understood that, when an element is referred to as being located "on", "above", "below", or "beside" another element, one or more intervening elements may be present between the two elements unless such terms are preceded by "directly".

Spatially relative terms, such as "upper portion", "upper surface", "lower portion", "lower surface", and the like, are defined with reference to the drawings, and do not indicate absolute orientations. In other words, "upper portion (surface)" may be defined as "lower portion (surface)" and vice versa depending on the point of view.

Figure 2:
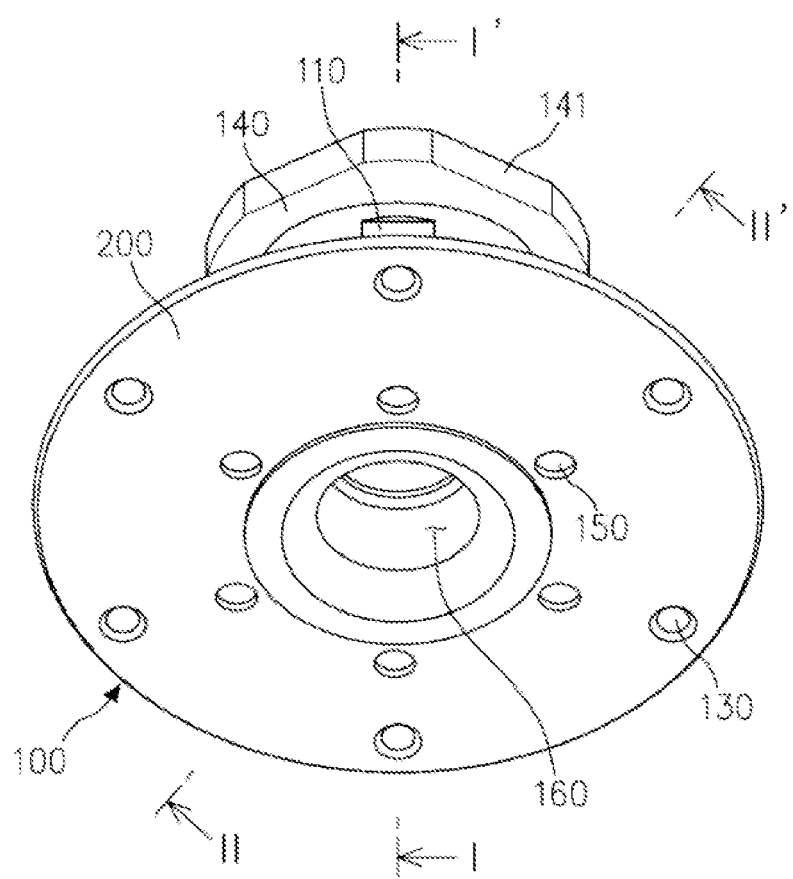
FIG. 2 is a bottom perspective view of the boss portion of FIG. 1.
Figure 3:
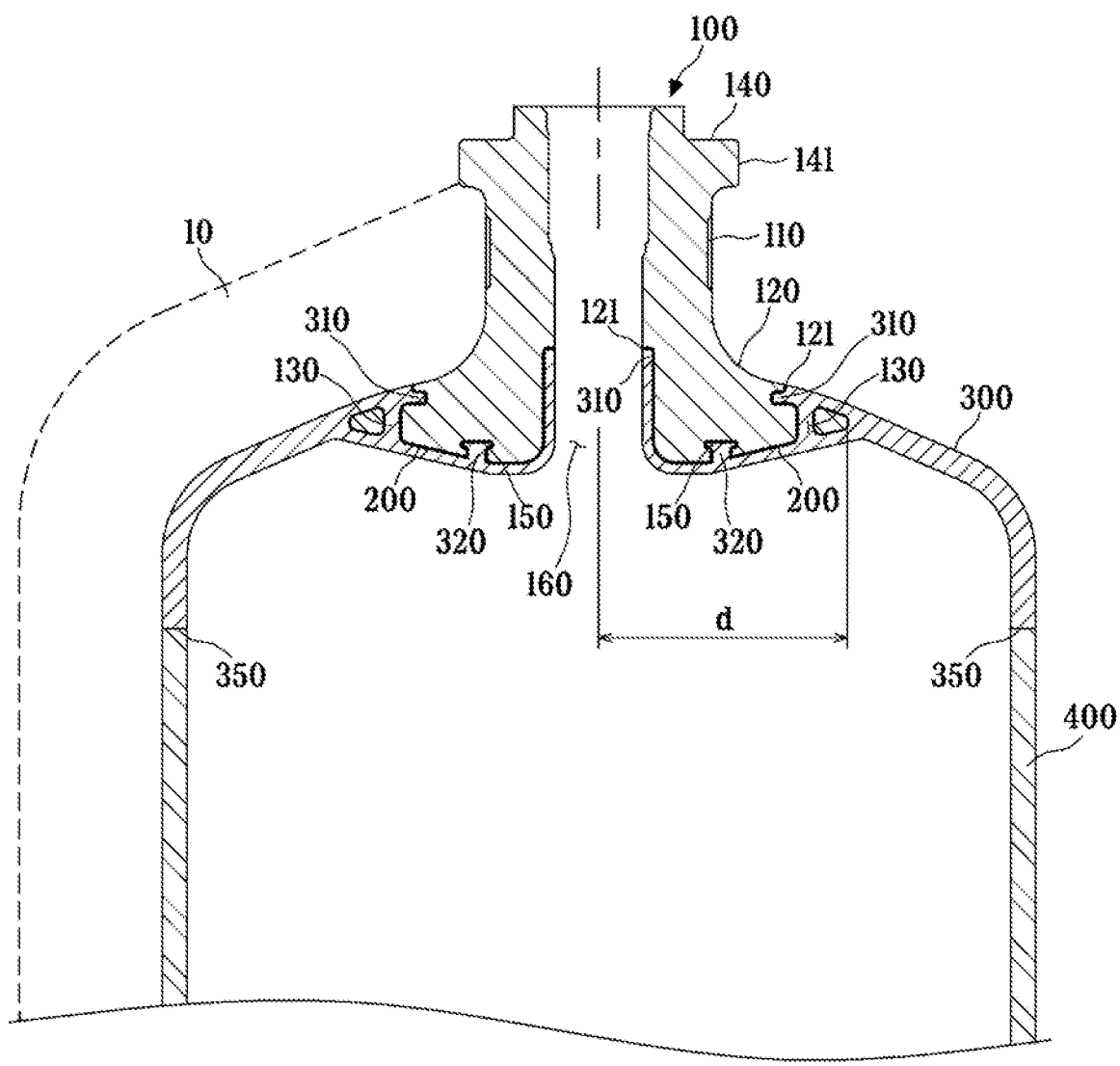
FIG. 3 is a side sectional view taken along line I-I' of FIG. 2.
Figure 4:
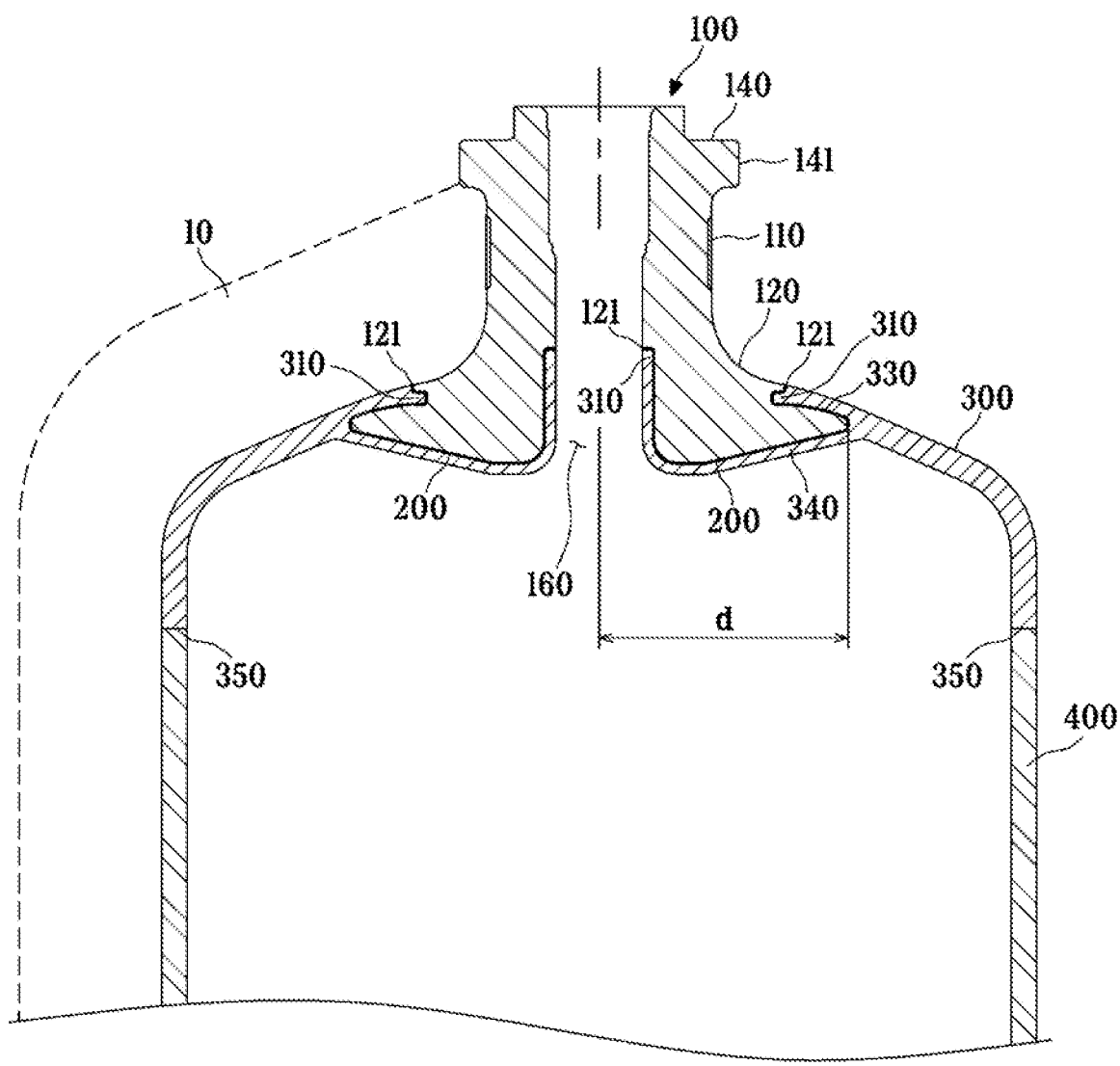
FIG. 4 is a side sectional view taken along line II-II' of FIG. 2.
Figure 5:
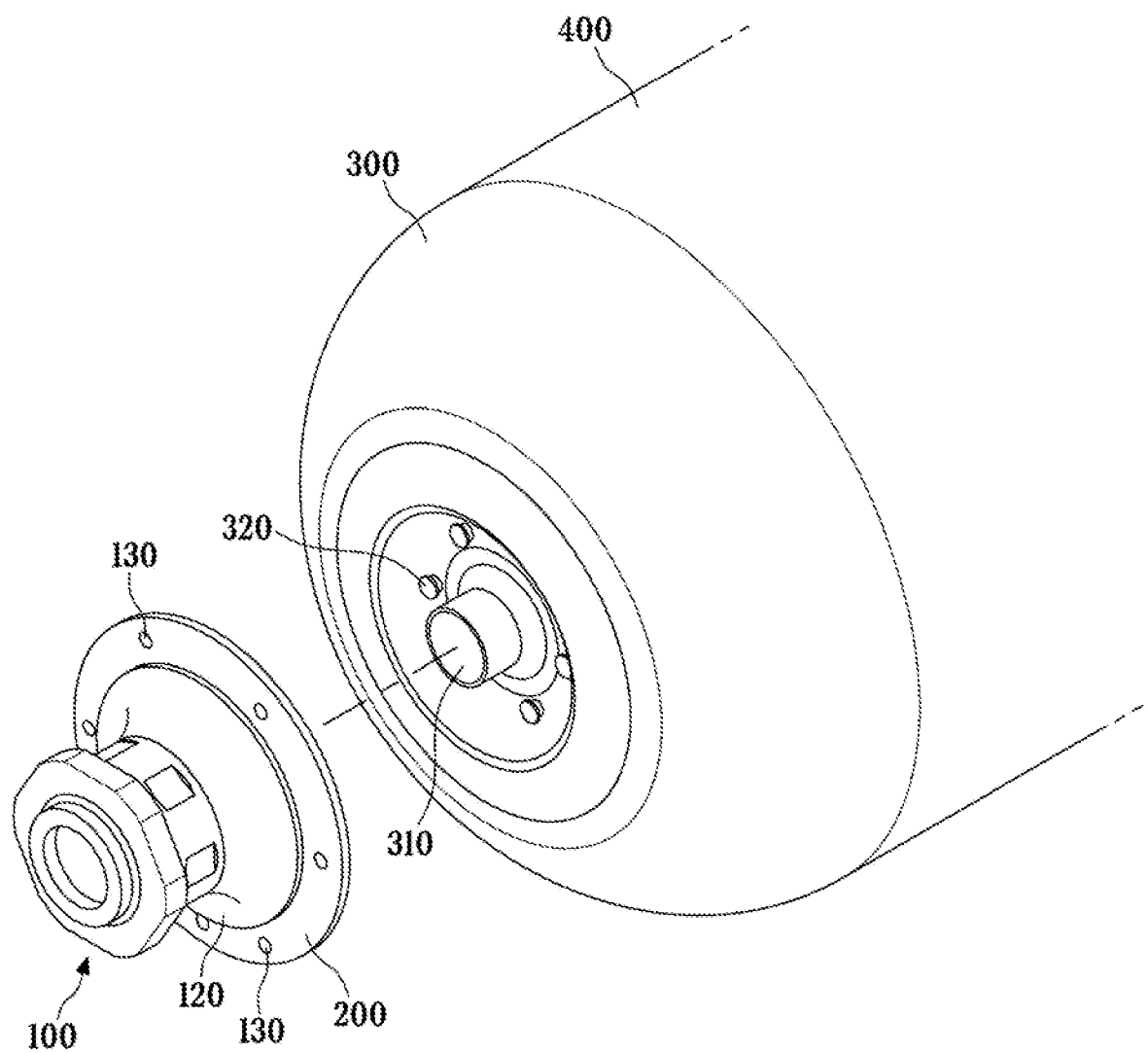
FIG. 5 is an exploded perspective view of the high-pressure tank having the sealing boss according to the embodiment.
Figure 6:
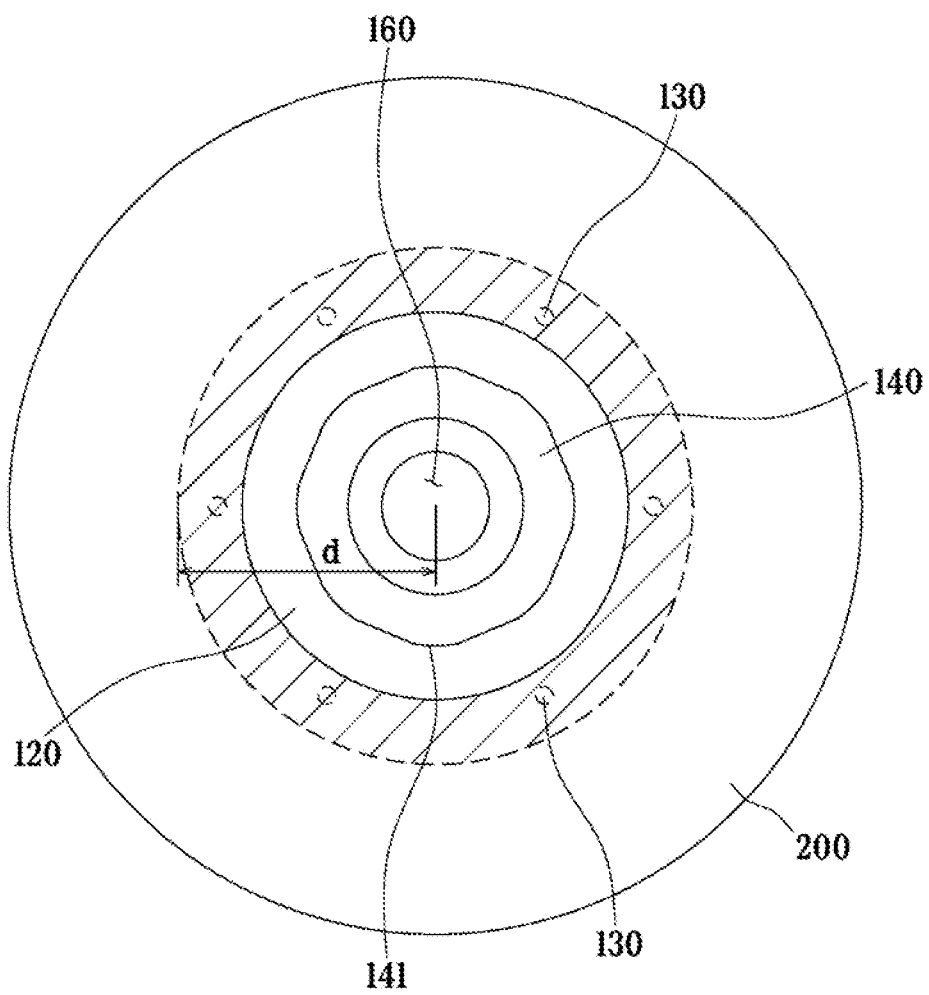
FIG. 6 is a top plan view of the high-pressure tank having the sealing boss according to the embodiment.

FIG. 1 is a top perspective view of a boss portion having a sealing structure of a high-pressure tank having a sealing boss according to an embodiment, FIG. 2 is a bottom perspective view of the boss portion of FIG. 1, FIG. 3 is a side sectional view taken along line I-I' of FIG. 2, FIG. 4 is a side sectional view taken along line II-II' of FIG. 2, FIG. 5 is an exploded perspective view of the high-pressure tank having the sealing boss according to an embodiment, and FIG. 6 is a top plan view of the high-pressure tank having the sealing boss according to an embodiment.

Hereinafter, a high-pressure tank having a sealing boss according to an embodiment will be described with reference to FIG. 1 to FIG. 6.

A high-pressure tank having a sealing boss according to the embodiment includes a boss portion 100, a sealing portion 200, a dome portion 300, and a liner portion 400.

The boss portion 100 has one end formed with a skirt 120 extending radially outward, wherein the skirt 120 has multiple connection holes 130 formed along an outer periphery thereof.

The boss portion 100 provides a port 160 that has a central through-hole and a predetermined length, and allows a fluid stored inside the dome portion 300 to be moved out of the high-pressure tank therethrough.

Here, the fluid is natural gas or hydrogen gas compressed to a high pressure of 700 bar or more.

The boss portion 100 may be formed of aluminum or stainless steel, and may support a pressure of 700 bar to 900 bar.

When the boss portion is formed of aluminum or stainless steel capable of supporting a pressure in the above range, it is possible to prevent the boss portion from being damaged by the fluid at high-pressure.

If the boss portion 100 is formed of general carbon steel, it is difficult to reduce the weight of the high-pressure tank. In addition, due to difficulty in forming carbon steel into the shape of the boss portion 100, it is difficult to couple the boss portion 100 to the dome portion 300 by metal insert molding.

In contrast, aluminum or stainless steel can be easily formed into the shape of the boss portion 100, and thus, makes it easy to couple the boss portion 100 with the dome portion 300.

The boss portion has a flange 140 at the other end, thereof, opposite to the one end where the skirt 120 is formed.

A locking groove 110 is formed at a circumferential surface of an outer periphery of a body of the boss portion 100. The locking groove 110 may include a plurality grooves arranged on the circumferential surface at a predetermined interval.

Although the locking groove 110 is preferably formed in a concave shape, the locking groove 110 may also be formed in a convex shape protruding to a predetermined height from the outer periphery of the body of the boss portion 100 depending on the method of forming the body of the boss portion 100.

The locking groove 110 allows a composite layer 10 to be more effectively wound on and secured to the dome portion 300 and the liner portion 400 in a damage-free fashion through a filament winding process.

The flange 140 is formed at the other end of the body of the boss portion 100, which is opposite the skirt 120.

The flange 140 may have a polygonal outer periphery 141.

When the flange 140 is integrally formed with the other end of the boss portion 100, it is possible to eliminate the need to provide an additional adapter to the boss portion 100.

Specifically, the outer periphery 141 of the flange 140 may have various polygonal shapes, for example, an octagonal shape or a hexagonal shape, depending on the fastening structure of the high-pressure tank.

The boss portion 100 is formed at the one end thereof with the skirt 120 extending radially outward.

The skirt 120 extends radially outward from a center of the boss portion 100, and is coupled with the dome portion 300.

In one embodiment, the skirt 120 is anodized.

Anodization of the skirt 120 can increase surface adhesion of the skirt 120 to a plastic resin, making it easy to coat the skirt 120 with a polyamide resin, thereby allowing easy formation of the sealing portion 200 as a polyamide resin coating layer.

In addition, anodization of the skirt 120 costs less, and is more efficient than anodization of the entire body of the boss portion 100.

Referring to FIG. 2, the skirt 120 has multiple connection holes 130 formed along the outer periphery thereof.

During insert injection molding, a resin forming the dome portion 300 is introduced into and cured in the connection hole 130, thereby forming a support tab extending through the connection hole 130.

The support tab is connected to one end 310 of the dome portion 300 to enhance physical coupling between the boss portion 100 and the dome portion 300, thereby effectively preventing the boss portion 100 from being separated from the dome portion 300.

Coupling of the boss portion 100 with the one end 310 of the dome portion through the connection hole 130 can eliminate the need for a separate fastening structure for coupling the dome portion 300 with the boss portion 100, such as a thread coupling mechanism, while effectively reducing the use of additional adhesives.

The skirt 120 is formed at one side thereof with a fastening groove 150 coupled with of the dome portion 300.

Referring to FIG. 3, like the connection hole 130, the fastening groove 150 allows a polyamide resin to be introduced thereinto and cured therein during metal insert injection molding, such that a key 320 formed at the dome portion 300 is fastened to the fastening groove 150.

The fastening groove 150 has a narrow entrance and an enlarged inner space to maintain engagement between the one end of the boss portion 100 and the fastening groove 150, thereby maintaining constant coupling between the boss portion 100 and the dome portion 300.

In one embodiment, a polyamide resin is introduced into and cured in the connection hole 130 and the fastening groove 150 of the skirt 120 during metal insert injection molding, such that the degree of physical coupling between the boss portion 100 and the dome portion 300 can be increased due to the mechanical structure of the connection hole 130 and the fastening groove 150, thereby effectively preventing the boss portion 100 from being separated from the dome portion 300.

The skirt 120 extends radially outward and has a circular shape. The connection hole 130 may include multiple connection holes which are symmetrical with one another with respect to the center of the boss portion 100 and arranged at a first predetermined interval along a first circumference of the skirt 120. The fastening groove 150 may include multiple fastening grooves which are symmetrical with one another with respect to the center of the boss portion 100 and arranged at a second predetermined interval along a second circumference of the skirt 120.

Referring to FIG. 4, in a region where the connection hole 130 and the fastening groove 150 are not disposed, the skirt 120 of the boss portion 100 extends to the dome portion 300.

In one embodiment, one end of the skirt 120 extends radially outward from the center of the boss portion 100 such that the skirt 120 occupies 20% to 40% of the total radial area formed by the skirt 120 and the dome portion 300. Here, it is understood that the center of the dome portion 300 may coincide with the center of the boss portion 100 which may form a center axis or rotational axis of the boss portion 100.

Referring to FIG. 6, when the one end of the skirt 120 extends radially outward from the center of the boss portion 100 to a predetermined length d such that the skirt 120 occupies 20% to 40% of the total radial area formed by the skirt 120 and the dome portion 300 as viewed from the front of the dome portion 300, it is easy to maintain coupling between the boss portion 100 and the dome portion 300.

When the area of the skirt 120 are radially inserted and fitted between upper and lower radial branches 330 and 340 of the dome portion 300 formed at an upper end thereof falls within the above range, it is possible to prevent leakage of the fluid at high-pressure and to maintain gas-tightness of the high-pressure tank due to increase in area of an interface at which a coating layer on the outer surface of the skirt 120 is chemically bonded to the radial branches 330 and 340 of the dome portion 300.

It is noted here that although the present embodiment shows only two radial branches 330 and 340, the number of the radial branches may be more or less than two, according to an embodiment. However, in either embodiment, one or more radial branches 330 and 340 are formed to overlap the skirt 120 of the boss portion 100 to increase an area of interfacing of the dome portion 300 with the skirt 120 to secure gas-tightness of the high-pressure tank. It is understood here that the one end 310 of the dome portion 300 is formed as a circumferential end of each of the radial branches 330 and 340 of the dome portion 300, as shown in FIGS. 3 and 4.

If the area of the skirt 120 exceeds the above range, this causes reduction in efficiency in forming the boss portion 100, and thus reduction in overall process efficiency, making it difficult to increase economic feasibility through mass production.

The skirt 120 is formed at one side of both outer and inner peripheral surfaces thereof with a stepped portion 121 receiving the one end 310 of the dome portion 300 and being coupled thereto.

The stepped portion 121 allows the one end 310 of the dome portion 300 to be correspondingly formed to a thickness corresponding to the depth of the stepped portion 121 or in the shape of the stepped portion 121 by metal insert injection molding, whereby the boss portion 100 can be firmly coupled to the dome portion 300 in a gas-tight manner.

That is, the stepped portion 121 serves to enhance coupling between the boss portion 100 and the dome portion 300.

The sealing portion 200 is formed on the outer surface of the skirt 120. It is understood here that the outer surface of the skirt 120 includes the outer and inner peripheral surfaces where the stepped portion 121 is formed.

The sealing portion 200 is formed by coating a polyamide resin onto the outer surface of the skirt 120 of the boss portion 100.

In one embodiment, the sealing portion 200 is formed by coating a material selected from among polyphthalamide (PPA), polyamide 6 (PA6), polyamide 11 (PA11), polyamide 12 (PA12), and polyarylamide (PARA) onto the outer surface of the skirt 120 to a thickness of 150 μm to 350 μm.

These types of thermoplastic resins are effective in forming a coating layer on aluminum or stainless steel.

When the sealing portion 200 is formed of these types of polyamide resins, the boss portion 100 can be coupled to the dome portion 300 by metal insert injection molding.

The dome portion 300 is integrally coupled with the sealing portion 200.

The dome portion 300 is chemically bonded to the sealing portion 200, and forms a gas-tight interface with a metal surface of the sealing portion 200 to form a sealing structure.

When the sealing portion 200 is formed as a coating layer having a thickness of 150 μm to 350 μm, chemical bonding between the coating layer as the sealing portion 200 and the radial branches 330 and 340 of the dome portion 300 can be easily achieved, and thus, improved gas-tightness can be achieved.

If the thickness of the sealing portion 200 exceeds the above range, increase in gas-tightness relative to increase in thickness of the coating layer is insignificant, whereas, if the thickness of the sealing portion 200 is less than the above range, gas-tightness between the boss portion 100 and the dome portion 300 can be reduced due to reduction in thickness of the coating layer chemically bonded to the dome portion 300.

When the sealing portion 200 is formed as a coating layer composed of the aforementioned types of polyamide resin, and the dome portion 300 is formed of a polyamide resin, a gas-tight interface can be formed between the sealing portion 200 and the dome portion 300 through chemical bonding therebetween during metal insert injection molding.

In one embodiment, the dome portion 300 may be formed of a polyamide resin, for example, a material selected from among polyphthalamide (PPA), polyamide 6 (PA6), polyamide 11 (PA11), polyamide 12 (PA12), and polyarylamide (PARA). Here, the dome portion 300 may be formed of the same material as the sealing portion 200. However, according to an embodiment, the dome portion 300 may be formed of a material different form the sealing portion 200.

A typical high-pressure tank having a boss structure requires machining of a thread on a liner port 160 during molding of a liner and machining of a corresponding thread on an inner hole of a boss for thread coupling. In contrast, according to the present embodiment, the boss portion 100 is coupled with the dome portion 300 via the sealing portion 200 without using a thread coupling mechanism.

Referring to FIG. 5, since the sealing portion 200 formed on the boss portion 100 can ensure maintenance of gas-tightness even when the boss portion 100 is coupled with the dome portion 200, it is possible to eliminate the need for additional components for enhancement in gas-tightness, such as an O-ring and a backup ring, the need for a separate adhesive to bond the boss portion 100 to the dome portion 300, and the need for machining threads for coupling between a boss and a liner, as in the related art.

The liner portion 400 is coupled with the dome portion 300.

In one embodiment, the boss portion 100 and the dome portion 300 may be integrally coupled with each other by metal insert injection molding, followed by joining the liner portion 400 with the dome portion 300.

Here, the liner portion 400 is formed at one end thereof with a joint portion 350 joined with the dome portion 300.

Although the high-pressure tank may be manufactured through a metal insert injection molding process in which the boss portion 100 is inserted into a mold and the liner portion 400 and the dome portion 300 are formed at the same time by rotational molding, manufacturing the high-pressure tank though a process in which the boss portion 100 is inserted into a mold, the dome portion 300 is integrally formed with the boss portion 100, and the liner portion 400 is joined with the dome portion 300 is more advantageous in maintaining coupling and gas-tightness between the boss portion 100 and the dome portion 300.

When the high-pressure tank is manufactured by forming the boss portion 100 and the dome portion 300 by metal insert injection molding, followed by joining the liner portion 400 with the dome portion 200, the dome portion 200 and the liner portion 400 may be formed of different materials.

According to an embodiment, there is also provide a method of manufacturing a high-pressure tank having a sealing boss.

Figure 7:
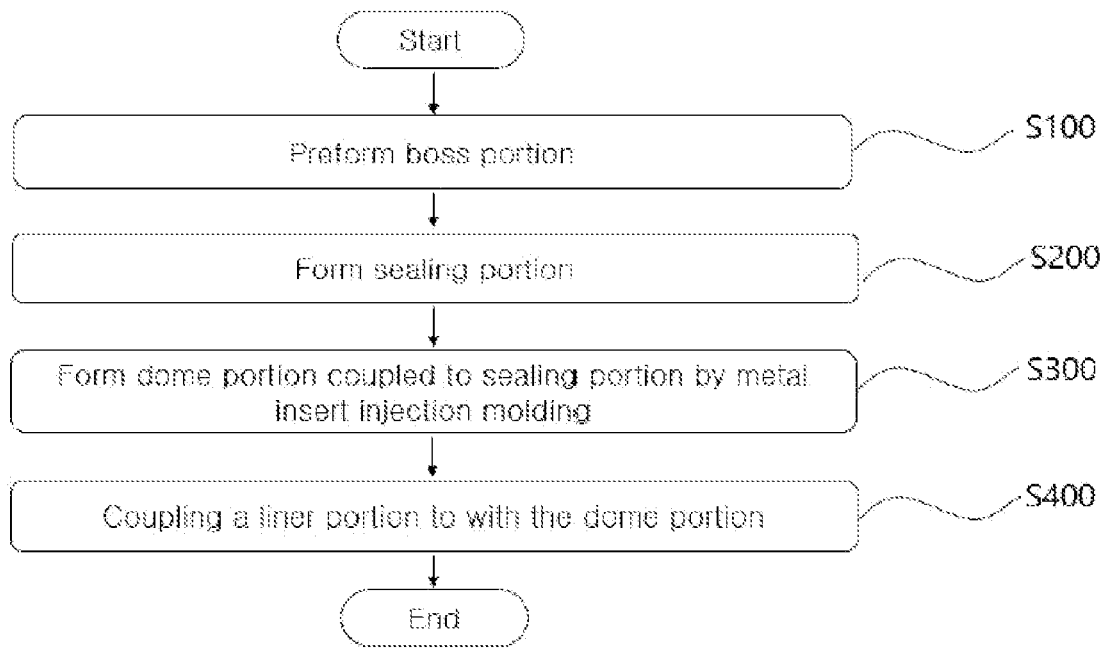
FIG. 7 is a flowchart of a method of manufacturing a high-pressure tank having a sealing boss according to another aspect.

FIG. 7 is a flowchart of a method of manufacturing a high-pressure tank having a sealing boss, according to an embodiment.

Referring to FIG. 7, a boss portion having one end formed with a skirt extending radially outward is preformed, wherein the skirt has multiple connection holes formed along an outer periphery thereof (S100).

The connection holes and fastening grooves formed on the skirt may be formed by milling machining before molding of the boss portion.

Formation of the connection holes and the fastening grooves can enhance mechanical coupling between the boss portion and a dome portion, thereby preventing the boss portion from being separated from the dome portion by a fluid at high pressure.

Then, a sealing portion is formed by coating a thermoplastic resin onto an outer surface of the skirt (S200).

In one embodiment, the thermoplastic resin may be a polyamide resin, specifically a material selected from among polyphthalamide (PPA), polyamide 6 (PA6), polyamide 11 (PA11), polyamide 12 (PA12), and polyarylamide (PARA).

Then, the dome portion coupled with the sealing portion is formed by metal insert injection molding in which the boss portion with the sealing portion formed thereon is loaded into a mold and a thermoplastic resin is injected into the mold (S300).

The thermoplastic resin may be a polyamide resin, specifically a material selected from polyphthalamide (PPA), polyamide 6 (PA6), polyamide 11 (PA11), polyamide 12 (PA12), and polyarylamide (PARA). Preferably, but not necessarily, the dome portion is formed of the same material as the sealing portion.

When the sealing portion and the dome portion are formed of the same material, the boss portion and the dome portion can be integrally formed by maintaining constant injection conditions during metal insert injection molding.

Then, a liner portion is formed and coupled with the dome portion (S400).

The high-pressure tank is finally manufactured by coupling the liner portion to the dome portion.

When the high-pressure tank is manufactured by a process in which the boss portion and the dome portion are integrally formed by injection molding and then the liner portion is formed and coupled to the dome portion, it is easy to maintain gas-tightness between the boss portion and the dome portion through prevention of damage to the sealing portion.

In the present embodiment, the liner portion is separately formed after the dome portion is formed. However, the inventive concept is not limited thereto. According to another embodiment, a dome portion and a liner portion may be formed at the same time by rotational liner molding in which the boss portion with the sealing portion formed thereon is loaded into a mold and a thermoplastic resin is injected into the mold.

Figure 8:
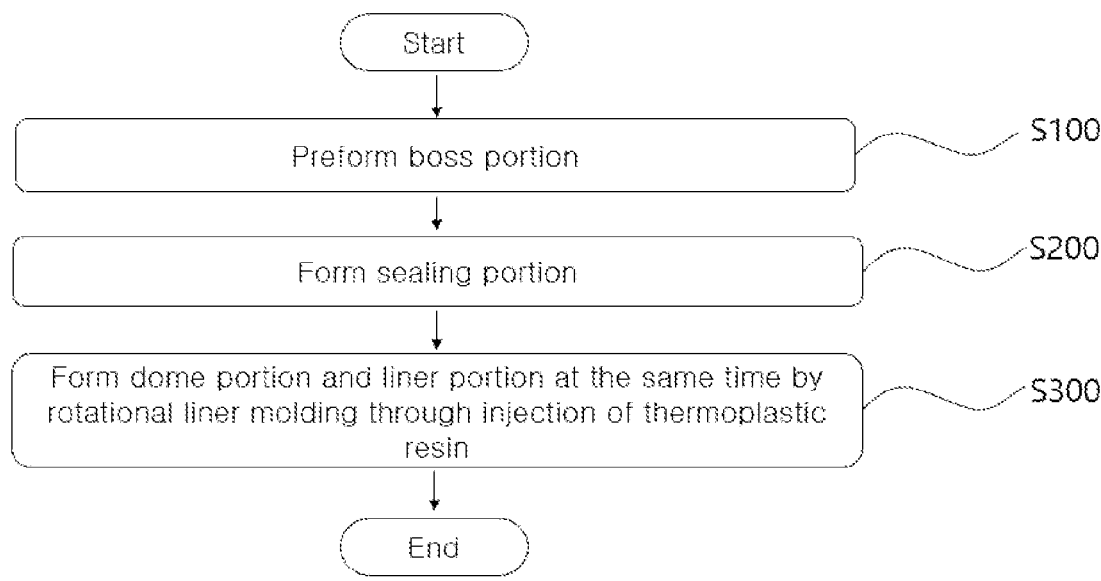
FIG. 8 is a flowchart of a method of manufacturing a high-pressure tank equipped with a sealing boss according to a further aspect.

FIG. 8 is a flowchart of a method of manufacturing a high-pressure tank having a sealing boss, according to another embodiment.

Referring to FIG. 8, a high-pressure tank having a sealing boss may be manufactured by preforming a boss portion (S1000), forming a sealing portion (S2000), and forming a dome portion and a liner portion at the same time by rotational liner molding in which the boss portion with the sealing portion formed thereon is loaded into a mold and a thermoplastic resin is injected into the mold (S3000).

Forming the dome portion and the liner portion at the same time by rotational liner molding in which the boss portion with the sealing portion formed thereon is loaded into the mold and the thermoplastic resin is injected into the mold can ensure high production efficiency.

It is noted here that, referring to FIGS. 1-6, the dome portion 300 of the high-pressure tank is referred to as such due to a circumferentially curved structure between the liner portion 400 and a radial portion including the radial branches 330 and 340. Thus, it is further noted that the dome portion 130 and the liner portion 400 connected through the circumferentially curved structure may be referred to as a tank body which may be formed at the same time as described above, wherein the tank body includes an upper portion and a lower portion corresponding to the dome portion 300 and the liner portion 400, respectively.

Although some embodiments have been described herein, it will be understood by those skilled in the art that various modifications, changes, and alterations can be made without departing from the spirit and scope of the inventive concept. The inventive scope should be defined by the appended claims rather than by the foregoing description, and the claims and equivalents thereto are intended to cover such modifications and the like as would fall within the scope of the inventive concept.

What is claimed is:

1. A high-pressure tank comprising:
   a boss portion having a skirt extending radially outward formed at one end of the boss portion, the skirt having a plurality of connection holes formed along an outer periphery of the skirt;
   a sealing portion formed on an outer surface of the skirt;
   a dome portion coupled with the sealing portion; and
   a liner portion coupled with the dome portion,
   wherein the skirt comprises a plurality of fastening grooves respectively coupled with keys of the dome portion, each of the plurality of fastening grooves having a narrow entrance and an enlarged inner space, forming a T-shape,
   wherein the skirt has a first stepped portion and a second stepped portion, the first stepped portion, which is recessed, is formed at an outer peripheral surface of the skirt, and the second stepped portion is formed at an inner peripheral surface of the skirt,
   wherein the second stepped portion provides a horizontal depth consistent along the inner peripheral surface of the skirt in a vertical direction, and allows a portion of the one end of the dome portion to be correspondingly formed on the second stepped portion to a horizontal thickness corresponding to the horizontal depth along the inner peripheral surface,
   wherein the dome portion is coupled with the first stepped portion and the second stepped portion,
   wherein one end of the dome portion coupled with the second stepped portion is in contact with a port of the high-pressure tank,
   wherein the boss portion and the dome portion are connected to each other via the sealing portion without using threads or an O-ring, and
   wherein the plurality of fastening grooves are symmetrical with each other with respect to a center of the boss portion, and the plurality of fastening grooves are spaced apart from each other in a circumferential direction of the skirt.

2. The high-pressure tank of claim 1, wherein the boss portion has at least one locking groove formed at a circumferential surface of an outer periphery of a body of the boss portion, and the boss portion has a flange at another end of the boss portion.

3. The high-pressure tank of claim 2, wherein the flange has a polygonal outer periphery.

4. The high-pressure tank of claim 1, wherein the boss portion is formed of aluminum or stainless steel, and supports a pressure ranging from 700 bar to 900 bar.

5. The high-pressure tank of claim 1, wherein the skirt is anodized.

6. The high-pressure tank of claim 1, wherein the plurality of connection holes and the plurality of fastening grooves are configured to receive a resin which is configured to support connection between the boss portion and the dome portion.

7. The high-pressure tank of claim 1, wherein the skirt extends radially outward from the center of the boss portion such that the skirt occupies an area of 20% to 40% of a total radial area formed by the skirt and the dome portion.

8. The high-pressure tank of claim 1, wherein the sealing portion and a portion of the dome portion are integrally formed with each other, and chemically bonded to each other.

9. The high-pressure tank of claim 8, wherein the portion of the dome portion which is integrally formed with and chemically bonded to the sealing portion comprises a radial branch of the dome portion.

10. The high-pressure tank of claim 1, wherein the dome portion is formed of a polyamide resin.

11. The high-pressure tank of claim 1, wherein a total number of the plurality of connection holes is the same as a total number of the plurality of fastening grooves, and
wherein two of the plurality of connection holes and two of the plurality of fastening grooves are in a side section view of the high-pressure tank taken along a vertical plane that extends through the center of the boss portion.

12. A high-pressure tank comprising:
a boss portion having a skirt extending radially outward, the skirt having a plurality connection holes;
a tank body of which an upper portion is overlapped by the skirt of the boss portion so that the tank body is coupled with the boss portion; and
a sealing portion disposed between the skirt and the upper portion of the tank body,
wherein the skirt comprises a plurality of fastening grooves respectively coupled with keys of a dome portion of a lower portion of the tank body, each of the plurality of fastening grooves having a narrow entrance and an enlarged inner space, forming a T-shape,
wherein the skirt has a first stepped portion and a second stepped portion, the first stepped portion, which is recessed, is formed at an outer peripheral surface of the skirt, and the second stepped portion is formed at an inner peripheral surface of the skirt,
wherein the second stepped portion provides a horizontal depth consistent along the inner peripheral surface of the skirt in a vertical direction, and allows a portion of one end of the dome portion to be correspondingly formed on the second stepped portion to a horizontal thickness corresponding to the horizontal depth along the inner peripheral surface,
wherein the dome portion is coupled with the first stepped portion and the second stepped portion,
wherein one end of the dome portion coupled with the second stepped portion is in contact with a port of the high-pressure tank,
wherein the boss portion and the dome portion are connected to each other via the sealing portion without using threads or an O-ring, and
wherein the plurality of fastening grooves are symmetrical with each other with respect to a center of the boss portion, and the plurality of fastening grooves are spaced apart from each other in a circumferential direction of the skirt.

13. The high-pressure tank of claim 12, wherein the skirt comprises at least one connection hole, among the plurality of connection holes, and at least one fastening groove, among the plurality of fastening grooves, through which portions of the tank body are inserted for coupling with the skirt.

14. The high-pressure tank of claim 13, wherein the upper portion of the tank body comprises at least two radial branches between which the skirt is radially inserted and fitted.

15. The high-pressure tank of claim 14, wherein the boss portion comprises metal, and the skirt is anodized and comprises a polyamide resin.

16. The high-pressure tank of claim 12, wherein the plurality of connection holes and the plurality of fastening grooves are configured to receive a resin which is configured to support connection between the boss portion and the dome portion.

17. A high-pressure tank comprising:
a boss portion having a skirt extending radially outward formed at one end of the boss portion, the skirt having a plurality of connection holes formed along an outer periphery of the skirt;
a sealing portion formed on an outer surface of the skirt;
a dome portion coupled with the sealing portion; and
a liner portion coupled with the dome portion,
wherein the skirt comprises a plurality of fastening grooves respectively coupled with keys of the dome portion, each of the plurality of fastening grooves having a narrow entrance and an enlarged inner space, forming a T-shape,
wherein the skirt has a first stepped portion and a second stepped portion, the first stepped portion, which is recessed, is formed at an outer peripheral surface of the skirt, and the second stepped portion is formed at an inner peripheral surface of the skirt,
wherein the second stepped portion provides a horizontal depth consistent along the inner peripheral surface of the skirt in a vertical direction, and allows a portion of the one end of the dome portion to be correspondingly formed on the second stepped portion to a horizontal thickness corresponding to the horizontal depth along the inner peripheral surface,
wherein the dome portion is coupled with the first stepped portion and the second stepped portion,
wherein the boss portion comprises a central through-hole which forms a port of the high-pressure tank through which the dome portion is configured to flow out a fluid contained therein,
wherein the plurality of fastening grooves are symmetrical with each other with respect to a center of the boss portion, and the plurality of fastening grooves are spaced apart from each other in a circumferential direction of the skirt.

18. The high-pressure tank of claim 17, wherein the plurality of fastening grooves are at the bottom of the skirt, and the T-shape of each of the plurality of fastening grooves is in a vertical direction of the skirt.

19. The high-pressure tank of claim 17, wherein the second stepped portion, the plurality of fastening grooves, and the first stepped portion are positioned sequentially from the center of the boss portion.

\* \* \* \* \*